Oct. 20, 1931.  H. L. GUY  1,828,408
ELASTIC FLUID TURBINE CASING
Filed Nov. 8, 1929
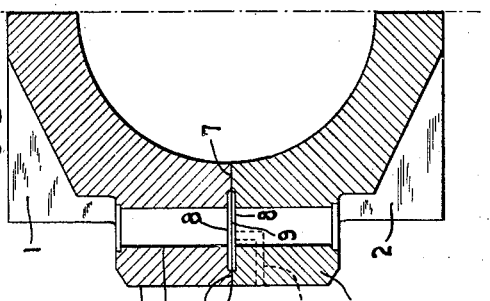
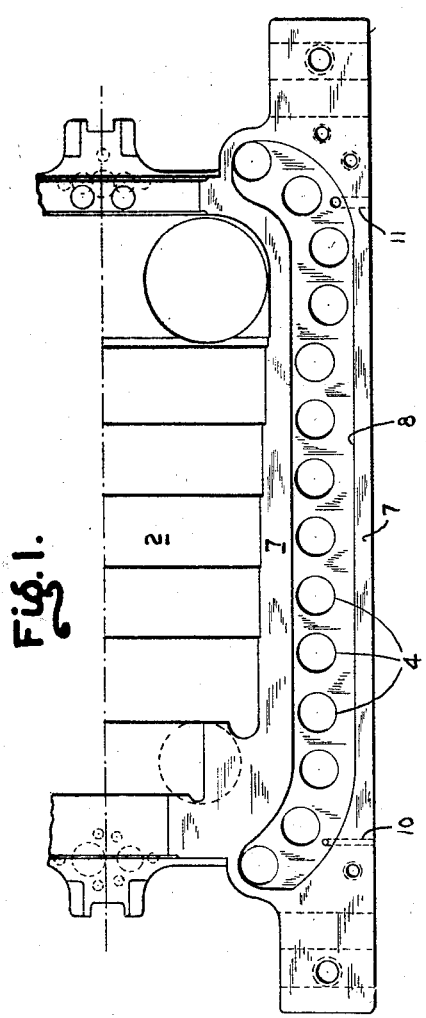
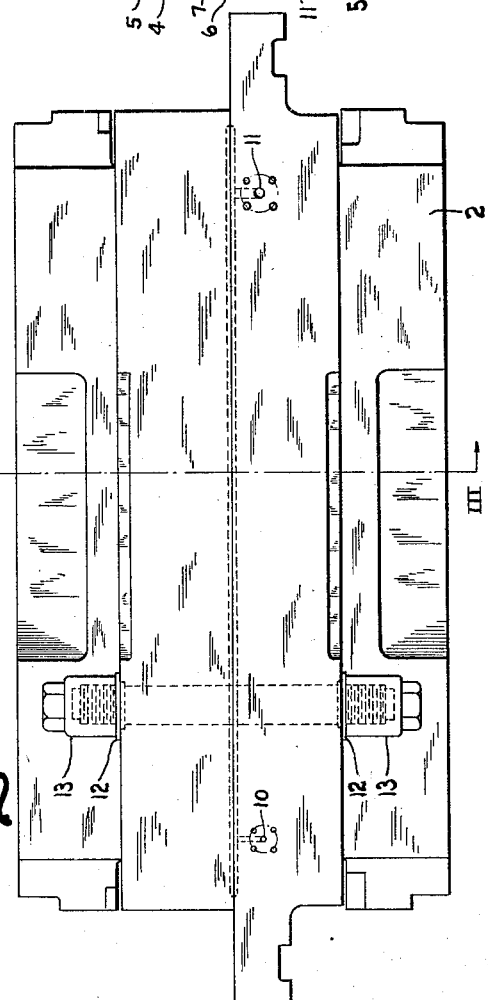
INVENTOR
H.L.Guy
BY
ATTORNEY Patented Oct. 20, 1931

1,828,408

UNITED STATES PATENT OFFICE

HENRY LEWIS GUY, OF HALE, ENGLAND, ASSIGNOR TO WESTINGHOUSE ELECTRIC & MANUFACTURING COMPANY, A CORPORATION OF PENNSYLVANIA

ELASTIC FLUID TURBINE CASING

Application filed November 8, 1929, Serial No. 405,782, and in Great Britain December 8, 1928.

This invention relates to elastic fluid turbines and concerns more particularly the cylinders or casings thereof.

In the case of steam turbines constructed to operate with steam at particularly high temperatures and pressures, it has been found that when starting the turbine, stresses may occur in the cylinder flanges considerably greater than those occurring during normal operation. These abnormal stresses may lead to straining of the bolts of the joints and/or of the cylinder itself such as may cause permanent deformation of these parts. There is also the likelihood of the steam-tightness of the joints being impaired.

The object of the present invention is to reduce the disadvantageous effects above referred to and according thereto channels or ducts are provided in the flange portions of the turbine cylinder in the region of the bolt holes, and provision is made for passing therethrough fluid of high temperature, preferably approximating to the temperature of the motive fluid which passes through the interior of the cylinder.

The fluid passing through the said channels or ducts comes into contact with the bolts and heats same at the same time as it heats the interior portions of the flanges, so that when starting the turbine the temperature of these parts is raised at substantially the same rate as the body of the cylinder itself. Excessive straining of the bolts and/or flanges during starting may thereby be effectively prevented, and the steam-tightness of the joints preserved.

The invention is illustrated in the accompanying drawings which show the cylinder of a steam turbine for utilizing motive fluid of particularly high temperature and pressure, and in which:

Fig. 1 is a plan view showing a portion of the lower half cylinder as seen when the upper half is removed;

Fig. 2 is a side elevation of the complete cylinder, only one of the flange bolts being shown in position; and, Fig. 3 corresponds to a half section on line III—III of Fig. 2.

The cylinder shown comprises upper and lower half cylinders 1, 2, which are adapted to be secured together by means of a suitable number of bolts 3 which are bossed through bolt holes 4 formed in the longitudinal flange portions 5 of the half cylinders. The meeting faces of the flanges 5 which form the longitudinal joint 6 of the cylinder must fit so perfectly and tightly together as to prevent the escape of motive fluid through the joint. In the construction shown however, the faces at the joint meet only upon the portions 7 (Figs. 1 and 3), which portions surround shallow depressions 8 formed longitudinally of the flanges in the region of the bolt holes 4.

Thus, when the cylinder halves are assembled together a channel or duct 9 is provided, to which steam may be admitted by way of an inlet conduit 10 entering near one end thereof, and led away by an outlet conduit 11 near the other end thereof. The conduits 10, 11, are arranged so that the flow of steam through the channel 9 takes place mainly in the same general direction as that of motive fluid in the cylinder, namely, from left to right as viewed in Figs. 1 and 2.

The steam supplied to the inlet conduit 10 may be tapped off from the supply of motive fluid for the turbine or from any other suitable source, but is preferably of such temperature and quantity as to raise the temperature of the flange portions 6 and the bolts 3 with which it comes into contact, at substantially the same rate as the body of the cylinder itself is heated by the motive fluid therein when starting the turbine. The steam may be admitted to the channel 9 with a gradually increasing temperature or rate of flow if desired.

The supply of the heating steam to channel 9 may be suitably controlled by valves which are opened when starting the turbine and remain open until the turbine cylinder attains its normal temperature of operation, whereafter they may be closed. It may also be desirable to open said valves to admit heating steam to the channels at any time that the supply of motive steam to the turbine is suddenly increased.

While in the construction shown, the channel 9 is formed by depressions 8 in both the upper and lower halves of the turbine flange 6, it will be apparent that only one of the said halves may be formed with a depression if desired, the face of the other half remaining plane. However, the arrangement shown may facilitate the machining of the portions 7, which are of relatively restricted area, and by reason of the spacing of these portions and the disposition of the bolts 3 therebetween the maintenance of a steam-tight joint may also be facilitated.

The channel 9 may be only a small fraction of an inch in thickness, the depth as represented in Figs. 2 and 3 having been somewhat exaggerated for the sake of clearness. Leakage of the heating steam from the channel through the bolt holes may be immaterial, but may be prevented by the washers 12 placed beneath the cap nuts 13.

It will be evident that the invention may also be applied to the circumferential flanges of cylinders which have circumferential joints.

While I have shown my invention in but one form, it will be obvious to those skilled in the art that it is not so limited, but is susceptible of various changes and modifications, without departing from the spirit thereof, and I desire, therefore, that only such limitations shall be placed thereupon as are imposed by the prior art or as are specifically set forth in the appended claim.

What I claim is:

An elastic fluid turbine casing for operation at high pressure and high temperature, said casing being divided into parts having flange portions at the meeting faces, bolts extending through openings in the flange portions for securing the parts together, one of the meeting faces of the flange portions being formed with a recess extending the full length of the fluid-enclosing portion of the casing and extending to said bolts, and means for conveying, through said recess, heating fluid at substantially the temperature of the motive fluid admitted to the turbine, into contact with the bolts, whereby the bolts are heated to the same temperature as the flange portions and straining thereof is avoided.

In testimony whereof, I have hereunto subscribed my name this 22nd day of October, 1929.

HENRY LEWIS GUY.